United States Patent [19]

Meisner et al.

[11] Patent Number: 4,896,412
[45] Date of Patent: Jan. 30, 1990

[54] ASSEMBLY TOOL FOR MARINE DRIVE LOWER GEARCASE

[75] Inventors: Randall R. Meisner, Berlin; Gary C. Plonske, Oshkosh, both of Wis.

[73] Assignee: Brunswick Corporation, Skokie, Ill.

[21] Appl. No.: 316,093

[22] Filed: Feb. 27, 1989

[51] Int. Cl.⁴ .............................................. B23P 19/04
[52] U.S. Cl. ...................................... 29/263; 29/256; 29/258; 29/264
[58] Field of Search ................. 29/256, 258, 263, 264, 29/271; 254/98

[56] References Cited

U.S. PATENT DOCUMENTS

| | | | |
|---|---|---|---|
| 1,438,039 | 12/1922 | Hurlbut | 29/263 |
| 2,104,967 | 1/1938 | Bergert | 29/263 |
| 2,899,741 | 8/1959 | Dunkerley | 29/263 |
| 4,259,774 | 4/1981 | Dolinski | 29/263 |
| 4,530,667 | 7/1985 | McCormick . | |
| 4,682,395 | 7/1987 | Klann | 29/263 |
| 4,792,313 | 12/1988 | Meisenburg . | |

Primary Examiner—P. W. Echols
Assistant Examiner—R. Jordan
Attorney, Agent, or Firm—Andrus, Sceales, Starke & Sawall, Robert C. Curfiss

[57] ABSTRACT

An assembly method and tool is provided for installing a front driven gear (18) in a torpedo housing bore (24) in the lower gearcase (12) of a marine drive, without hammer blow impacting of the gear. An axial shaft (60) has a front end (62) inserted into the gear and an annular shoulder (66) for press-fitting the gear into the reduced diameter front portion (28) of the torpedo housing bore (24). A front aligner (68) is provided by an annular disc (69) having an outer circumference (70) loosley engaging the torpedo housing bore (24) and having a central opening (72) axially sliding over the axial shaft (60). A rear shaft aligner (76) has a threaded outer circumference (80) threadingly engaging a rear threaded portion (26) of the torpedo housing bore (24), and having a central axial opening (82) axially sliding over the rear end (64) of the axial shaft. The central opening (82) of the rear aligner (76) is extended axially at a stem (84) which has a rear end (86) which is internally threaded (88) and receives a threaded bolt (90) which is turned to engage the rear end (64) of the axial shaft and drive the latter axially forwardly such that its annular shoulder (66) pushes the gear (18) axially forwardly to press-fit the latter into the noted reduced diameter front portion (28) of the torpedo housing bore (24).

9 Claims, 3 Drawing Sheets

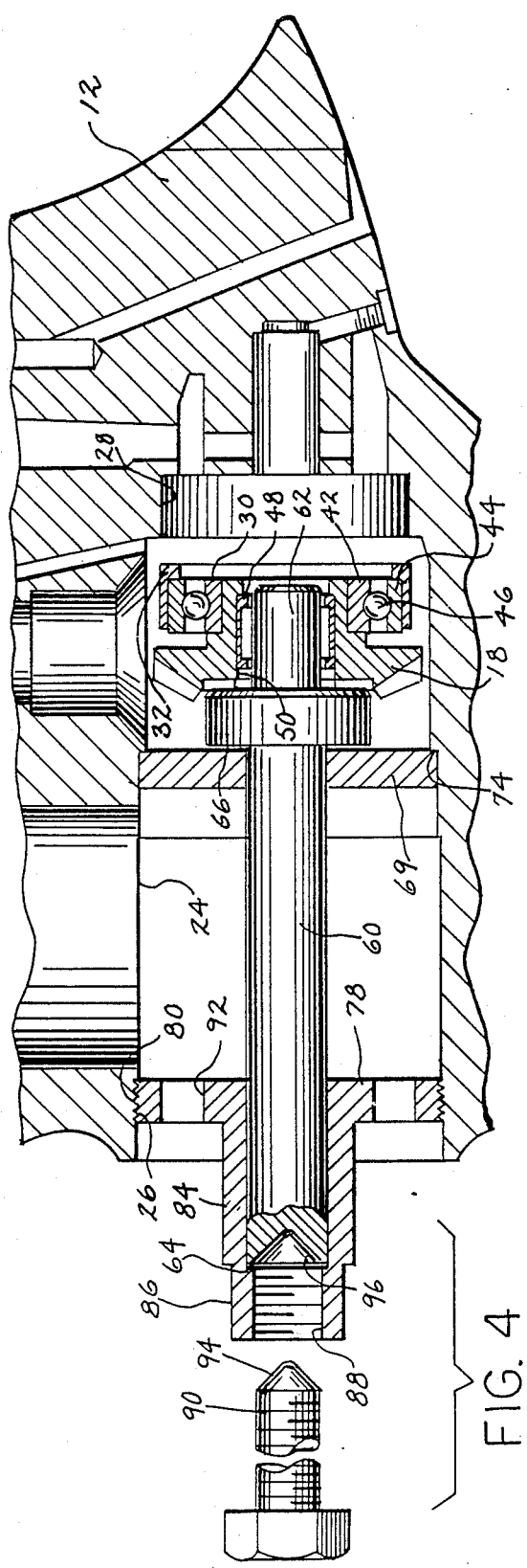
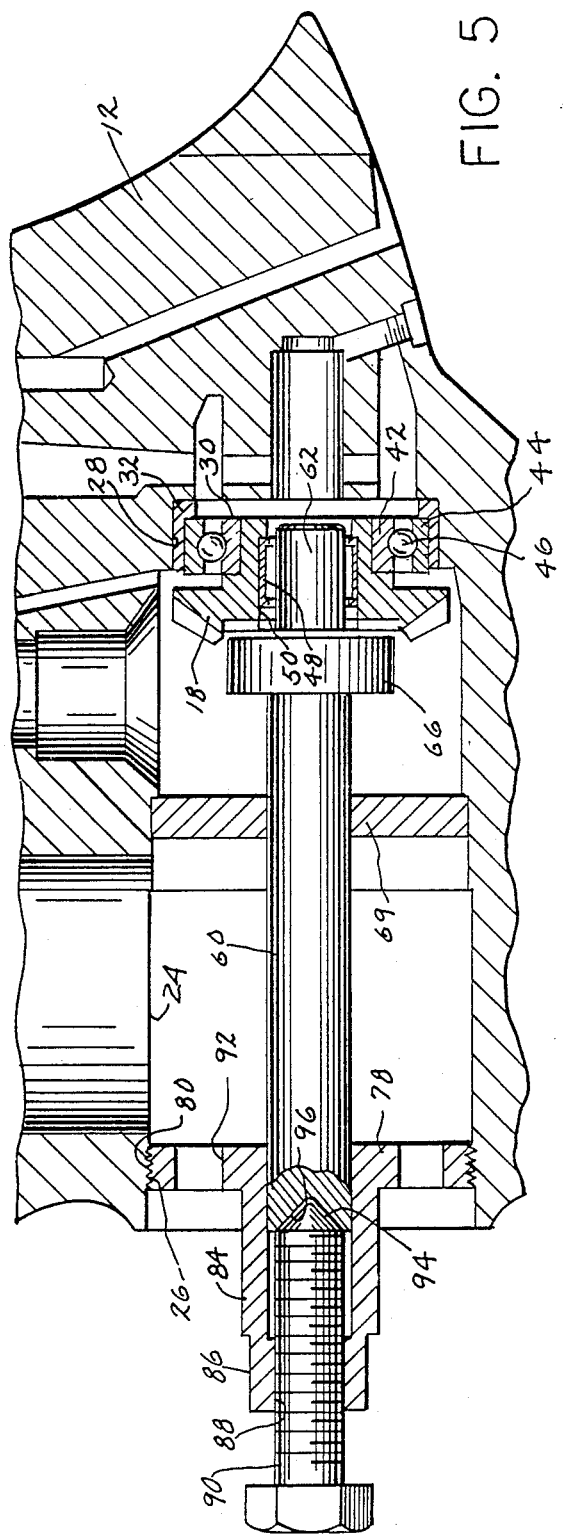
FIG. 4
FIG. 5

ASSEMBLY TOOL FOR MARINE DRIVE LOWER GEARCASE

BACKGROUND AND SUMMARY

The invention relates to marine drive lower gearcases with a vertical driveshaft having a lower pinion gear driving a driven gear at the front of a torpedo housing. The driven gear drives a horizontal propeller shaft extending rearwardly out of the torpedo housing. The torpedo housing has a rearwardly opening bore which is threaded at the rear, and which has a front reduced diameter portion for receiving and retaining the driven gear which is press-fit forwardly into such front portion of the bore. The invention more particularly relates to a method and tool for installing the driven gear in the bore in the torpedo housing, and press-fitting the driven gear into the front portion of the bore without impacting same with hammer blows or the like.

In the lower gearcase of a marine drive, it is typical that the forward gear is at the front of the gearcase and supported by tapered roller bearings to bear forward axial thrust, for example U.S. Pat. Nos. 4,530,667, 4,792,313, incorporated herein by reference. Such gears are typically installed into the torpedo housing bore by inserting same forwardly and then inserting an axial shaft into the gear, which shaft has a shoulder engaging the gear, and then impacting the shaft with hammer blows or the like, to push the gear axially forwardly to press-fit same in a reduced diameter front portion of the torpedo housing bore. The tapered roller bearings are assembled to the gear prior to insertion into the torpedo housing, and the design of such tapered roller bearings to absorb forward axial propeller thrust also enables such bearings to absorb the noted hammer blow impact during installation.

In some marine applications, for example those known as lefthand shiftable, particularly involving dual drives, the front gear in the lower gearcase is the reverse gear, and the rear gear is the forward gear. In this implementation, the front gear need only absorb axial thrust while the drive is in reverse, which is only a small percentage of the time and which involves much lighter axial thrust loads than forward. Accordingly, the front reverse gear need not be supported by tapered roller bearings or other axial thrust bearings, but instead can be supported by ball bearings or the like. In this latter implementation, however, it is desirable not to install such front reverse gear by the above noted impact hammer blow technique because the inner and outer races of the ball bearing may slide axially relative to one another or otherwise dislodge or unseat the balls.

The present invention addresses and solves the noted problem in a particularly simple and efficient manner, without the need of previously used hammer blow impacting.

BRIEF DESCRIPTION OF THE DRAWINGS

FIG. 4 is a view like FIGS. 1 and 2 and shows an installation step in accordance with the invention using the tool of FIG. 3.

FIG. 5 is a view like FIG. 4 and shows a further installation step.

DETAILED DESCRIPTION

Figure 1:
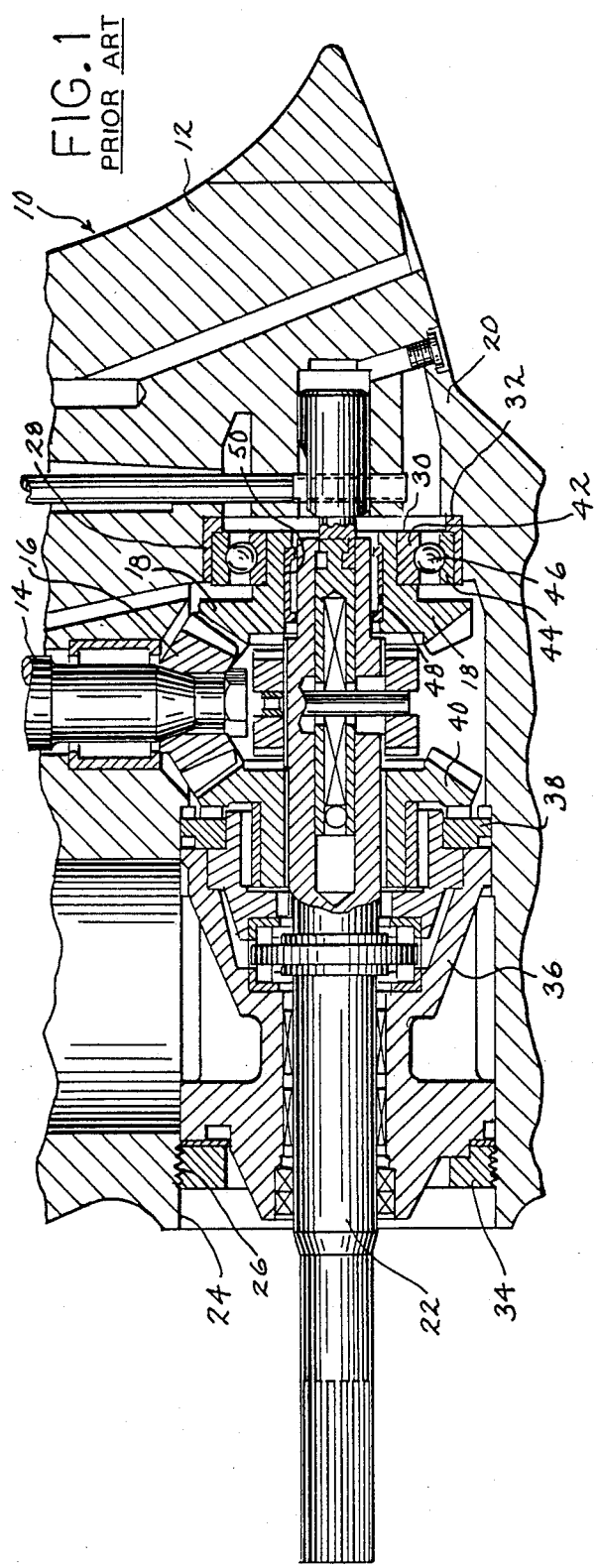
FIG. 1 is a side sectional view of a portion of a marine drive lower gearcase known in the prior art.
Figure 2:
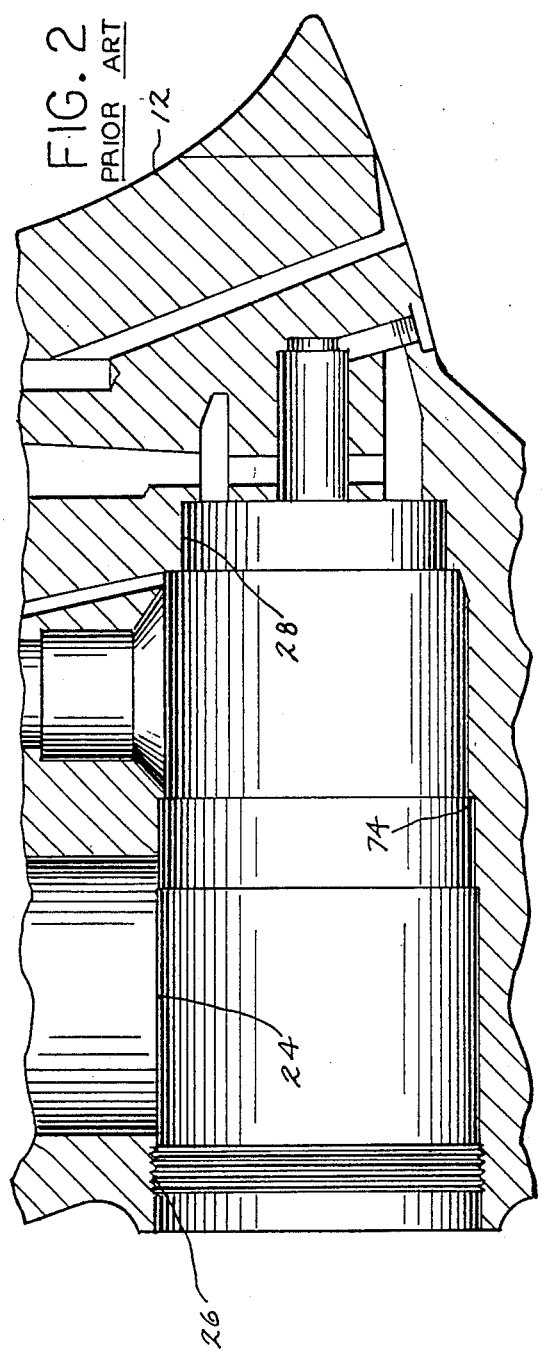
FIG. 2 is a view like FIG. 1, but shows the gear train removed.
Figure 3:
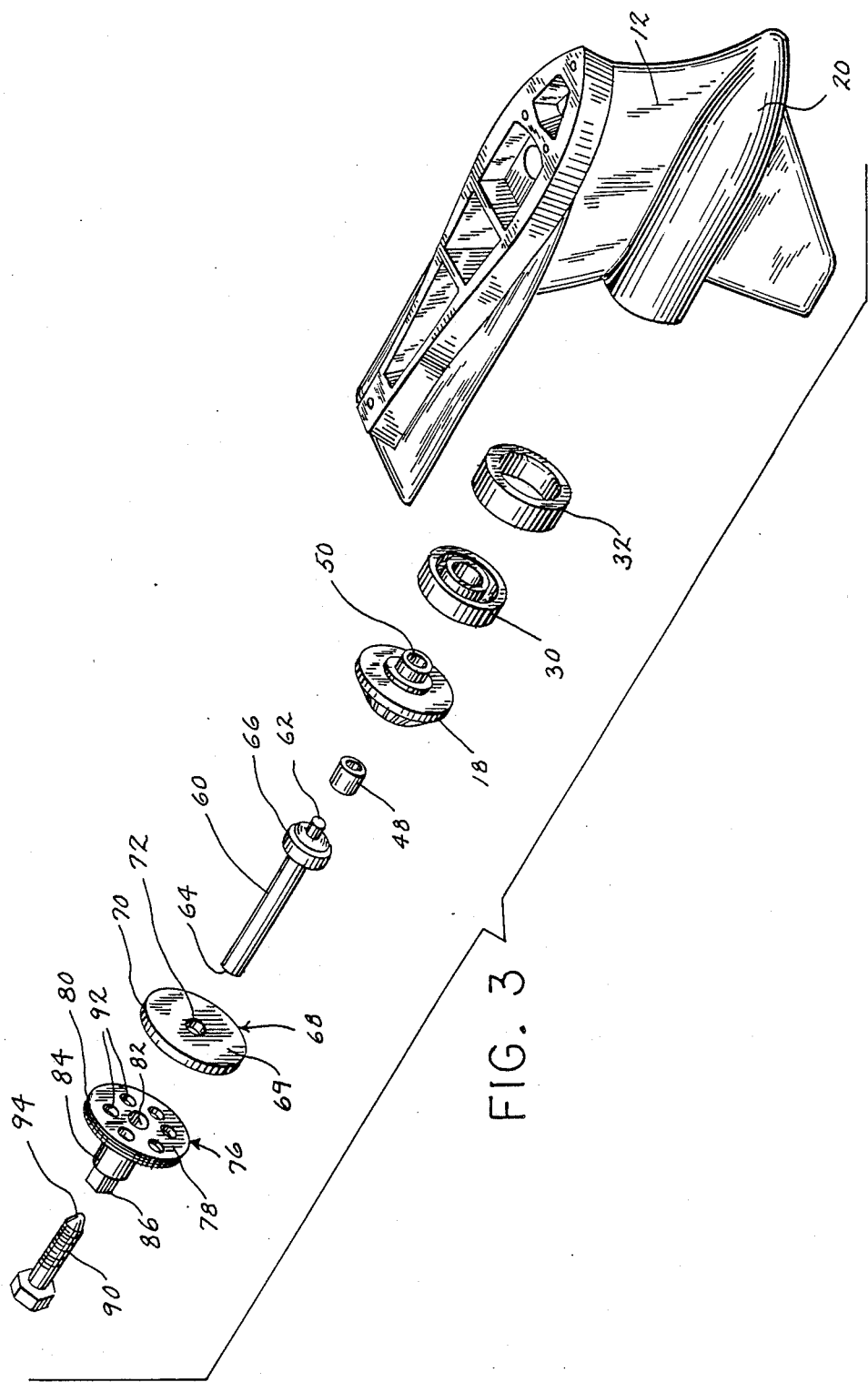
FIG. 3 is an exploded perspective view of the gear case of FIGS. 1 and 2 and a portion of the gear train thereof, and also showing an assembly tool in accordance with the invention.

FIG. 1 shows a marine drive 10 having a lower gearcase 12 with a vertical driveshaft 14 having a lower pinion gear 16 driving a driven gear 18 at the front of the torpedo housing 20, FIG. 3, of the gearcase. The driven gear drives a horizontal propeller shaft 22 extending rearwardly out of the torpedo housing. The torpedo housing has a rearwardly opening bore 24, FIG. 2, which is threaded at a rear portion 26 and which has a front reduced diameter portion 28 for receiving and retaining driven gear 18, including ball bearing 30 and bearing retainer cup 32, which is press-fit forwardly into reduced diameter front portion 28. Threads 26 hold spool retainer 34 and spool 36 in bore 24 which in turn holds axial thrust bearings 38 against the axial thrust of rear gear 40 which is the forward gear of the marine drive. This type of drive is known in the prior art and is typically called a lefthand shiftable gearcase. The front gear 18 is the reverse gear and need only absorb axial thrust while the drive is in reverse, which is a small percentage of the time and which involves substantially lighter axial loads than forward. This in turn enables the use of ball bearings such as 30 to support gear 18, rather than thrust bearings such as 38 or tappered roller bearings such as in incorporated U.S. Pat. No. 4,792,313. The ball bearings are usually used for the rear gear, as shown in incorporated U.S. Pat. No. 4,530,667, which is the reverse gear. However, in lefthand shiftable gearcases, the front gear is the reverse gear, as shown in FIG. 1. This arrangement is typically used in dual marine drives.

The present invention provides an assembly method and tool for installing front driven gear 18, with ball bearing 30 and bearing retainer cup 32 thereon, without impact hammer blows or the like which might otherwise tend to axially slide inner and outer bearing races 42 and 44 relative to one another, or dislodge ball 46, or otherwise skew the bearing cage structure. In the prior art, needle bearing 48 is inserted into central axial opening 50 in driven gear 18, and driven gear 18 is inserted into bearing 30 and bearing retainer cup 32, and this subassembly is inserted axially forwardly into bore 24 of torpedo housing 20. An axial shaft with an annular shoulder or the like is then inserted into bore 20 such that the shoulder engages gear 18. The end of the shaft is then impacted with a hammer to apply axial impact force press-fitting gear 18, including bearing 20 and cup 32, forwardly into reduced diameter front portion 28 of bore 24.

In the present invention, a tool is provided having an axial shaft 60, FIG. 3, with front and rear ends 62 and 64, and an annular shoulder 66 proximate front end 62. Front end 62 is inserted into gear 18 at axial opening 50, and shaft 60 and gear 18 are then inserted axially forwardly into torpedo housing bore 24. Alternatively, gear 18 is inserted into torpedo housing bore 24, followed by insertion of shaft 60 and insertion of front end 62 into opening 50 of gear 18. In both alternatives, gear 18 is partially preassembled to include needle bearing 48, ball bearing 30 and bearing retainer cup 32 prior to insertion onto tool end 62 or into torpedo housing bore 24.

A pilot front shaft aligner 68 is provided by an annular disc 69 having an outer circumference 70 sized to be approximately the same as the inner diameter of torpedo housing bore 24 and to loosely engage same. Disc 69 has a central axial opening 72 for receiving shaft 60 in axial sliding relation. Shaft aligner 68 is inserted over axial shaft 60 before or after insertion of shaft 60 into torpedo housing bore 24. Shaft aligner 68 is manually pushed forwardly to abut stop 74 in the bore, or in applications where the gearcase is turned 90° during assembly, such aligner 68 will naturally slide downwardly due to gravity until stopped by shoulder 74. Aligner 68 holds shaft 60, particularly front end 62 and gear 18, in axial alignment with reduced diameter front portion 28 of torpedo housing bore 24, as shown in FIG. 4.

A second shaft aligner 76 includes an annular disc 78 having an outer circumference 80 externally threaded to mate with threaded rear portion 26 of torpedo housing bore 24. Disc 78 has a central axial opening 82 for receiving shaft 60 in axial sliding relation. Rear aligner 76 is slid over axial shaft 60, with shaft 60 sliding axially in central axial opening 82, and aligner 76 is threaded into engagement at threaded circumference 80 with threaded rear portion 26 of torpedo housing bore 24, FIG. 4. Shaft aligner 76 includes a hollow stem 84 extending axially rearwardly from disc portion 78 at central opening 82. The rear end 86 of stem 84 has a given outer configuration, such as a hex or a square, to enable same to be gripped by a wrench or the like to turn aligner 76 about the axis thereof along shaft 60 into the noted threaded engagement with bore portion 26. Central axial opening 82 in disc portion 78 centrally aligns shaft 60, and the combination of front and rear spaced aligners 68 and 76 provide accurate axial alignment of front end 62 and gear 18 with reduced diameter front portion 28 of torpedo housing bore 24.

Central axial opening 82 in rear shaft aligner 76 extends axially rearwardly in stem 84, which extension provides further accurate alignment of axial shaft 60, particularly in those applications where front aligner 68 is omitted. This axial extension of opening 82 also enables shaft 60 to slide axially forwardly such that rear end 64 slides axially forwardly along extended opening 82 along a given travel path therein without leaving opening 82, FIG. 5, to be described. Rear end 86 of stem 84 is internally threaded at 88 and is of reduced diameter relative to axial opening 82 forward thereof. An externally threaded bolt 90 is turned into threaded engagement with opening 88, and upon continued rotation bolt 90 engages rear end 64 of shaft 60. Further rotation of bolt 90 pushes shaft 60 axially forwardly such that annular shoulder 66 pushes gear 18 axially forwardly and press-fits gear 18, including bearing 30 and cup 32, into reduced diameter front portion 28 of torpedo housing bore 24, FIG. 5. Aligner 76 is then threaded out of engagement with threaded rear portion 26 of torpedo housing bore 24, and aligners 76 and 68 and shaft 60 are removed axially rearwardly out of torpedo housing bore 24. During this withdrawal, annular shoulder 66 on shaft 60 engages and pulls front retainer 68 axially rearwardly out of bore 24.

Various assembly sequences are possible. As noted above, front end 62 of axial shaft 60 may be inserted into gear 18 before or after insertion into torpedo housing bore 24. Front aligner 68 may be inserted onto shaft 60 before or after insertion into torpedo housing bore 24. Rear aligner 76 may be inserted onto rear end 64 of shaft 60 before or after insertion into torpedo housing bore 24. Disc portion 78 of aligner 76 has access apertures 92 therein radially outward of central axial opening 82 to allow access to front aligner 68, to enable the latter to be slid axially forwardly after insertion of rear aligner 76, by means of a rod or the like extended through aperture 92 to engage and push aligner 68 forwardly. Front aligner 68 may be omitted if desired, but is preferred for enhanced accuracy of alignment of front end 62 of shaft 60. The front end 94 of bolt 90 and the rear end 64 of shaft 60 have a centering detent configuration, such as a convex conical tip 94 and concave conical notch 96, providing further accurate axial press-fit force on gear 18, and minimizing nonaxial force vectors.

The invention provides a simple efficient manner of gently ad accurately press-fitting gear 18 into reduced diameter front portion 28 of torpedo housing bore 24, and eliminates the need for hammer blow impacting thereof and its consequent deleterious effects.

It is recognized that various equivalents, alternatives and modifications are possible within the scope of the appended claims.

We claim:

1. In a marine drive having a lower gearcase with a vertical driveshaft having a lower pinion gear driving a driven gear at the front of a torpedo housing, said driven gear driving a horizontal propeller shaft extending rearwardly out of said torpedo housing, said torpedo housing having a rearwardly opening bore which is threaded at a rear portion and which has a front reduced diameter portion for receiving and retaining said driven gear which is press-fit forwardly into said front portion of said bore, a tool for installing said driven gear in said bore in said torpedo housing and press-fitting said driven gear into said front portion of said bore without impacting said gear with hammer blows or the like, comprising:

an axial shaft with front and rear ends and an annular shoulder proximate said front end, said front end being insertable into said driven gear with said annular shoulder engaging said driven gear;

a shaft aligner comprising an annular disc having an outer circumference externally threaded to mate with said threaded rear portion of said bore of said torpedo housing;

means cooperating with said axial shaft and said shaft aligner and rotatable about the axis of said axial shaft to apply axial force against said axial shaft to push said axial shaft forwardly such that said annular shoulder of said axial shaft pushes said driven gear forwardly and press-fits said driven gear into said reduced diameter front portion of said bore in said torpedo housing.

2. The invention according to claim 1 wherein said means cooperating with said axial shaft and said shaft aligner comprises threaded means anchored relative to said bore by said threaded rear portion of said bore of said torpedo housing.

3. The invention according to claim 2 wherein said shaft aligner has a central axial opening receiving said axial shaft in sliding relation, and wherein said central axial opening is internally threaded, and wherein said threaded means comprises a threaded bolt threadingly engaging said internally threaded central axial opening of said shaft aligner to engage said rear end of said axial shaft and apply said axial force thereto.

4. The invention according to claim 3 comprising a second shaft aligner comprising an annular disc having an outer circumference loosely engaging said bore in said torpedo housing and having a central axial opening receiving said axial shaft in sliding relation rearwardly of said annular shoulder and spaced forwardly of said first mentioned shaft aligner.

5. The invention according to claim 4 wherein said first shaft aligner has one or more access openings therein radially outward of said central opening and through which said second shaft aligner may be accessed and pushed forwardly in said bore to space said first and second shaft aligners and enhance alignment of said driven gear at said front end of said axial shaft with said reduced diameter front portion of said bore in said torpedo housing.

6. The invention according to claim 3 wherein said shaft aligner includes a hollow stem portion extending axially rearwardly from said disc at said central axial opening and defining an extended axial opening for receiving said axial shaft and providing extended alignment thereof, and enabling said rear end of said axial shaft to move forwardly along said central axial opening along a given axial travel stroke without leaving said central axial opening.

7. The invention according to claim 6 wherein the rear end of said stem has a given outer configuration to facilitate gripping thereof by a wrench and turning of said shaft aligner into threaded engagement with said threaded reaar portion of said bore of said torpedo housing, and wherein said rear end of said stem portion is internally threaded to mate with said threaded bolt.

8. The invention according to claim 7 wherein said rear end of said stem has a reduced inner diameter relative to the remainder of said stem forwardly thereof, said reduced inner diameter of said rear end of said stem being smaller than the outer diameter of said axial shaft at said rear end thereof.

9. The invention according to claim 8 wherein the forward end of said threaded bolt and said rear end of said axial shaft having mating detent configurations centering said axial force to minimize nonaxial force vectors pushing said driven gear into said reduced diameter front portion of said bore in said torpedo housing.

* * * * *